United States Patent [19]

Hopper

[11] 4,160,895
[45] Jul. 10, 1979

[54] WELDING MACHINE FOR VALVE HOUSINGS

[76] Inventor: Troy K. Hopper, 5943 Nunn, Houston, Tex. 77086

[21] Appl. No.: 766,912

[22] Filed: Feb. 9, 1977

[51] Int. Cl.² .............................................. B23K 9/04
[52] U.S. Cl. ............................ 219/125.1; 219/76.14; 219/158
[58] Field of Search .......... 219/125 R, 125 PL, 60 A, 219/76, 158, 120, 76.1, 76.14, 76.15, 125.1

[56] References Cited

U.S. PATENT DOCUMENTS

| Re. 21,733 | 3/1941 | Armstrong | 219/76 |
|---|---|---|---|
| 1,508,713 | 9/1924 | Noble | 219/125 R |
| 2,352,697 | 7/1944 | Dittrich | 219/158 X |
| 2,794,900 | 6/1957 | Width | 219/120 |
| 2,912,562 | 11/1959 | Donovan | 219/76.14 |
| 3,428,777 | 2/1969 | Certain | 219/125 R |
| 3,627,973 | 12/1971 | Smith | 219/76 |
| 3,769,486 | 10/1973 | Braucht | 219/76 |
| 3,841,547 | 10/1974 | Bartley | 219/125 R |

Primary Examiner—E. A. Goldberg
Attorney, Agent, or Firm—Bernard A. Reiter

[57] ABSTRACT

The body of a valve is partially rebuilt by using electrical welding device, first support apparatus, second support apparatus and a driving mechanism. The electrical welding device adds material to the inside of the valve body by using an electrode to provide an arc. The first support apparatus is used to detachably support the valve body aligned with a hole. The second support apparatus rotatably supports the electrode of the welding device in a relatively fixed relationship to the valve body and has an elongated tubular member extending through the hole in the first support apparatus. The driving mechanism rotates the tubular member and electrode about the elongated axis of the tubular member.

11 Claims, 5 Drawing Figures

WELDING MACHINE FOR VALVE HOUSINGS

BACKGROUND AND SUMMARY OF THE INVENTION

It is well known that the seat pocket in a valve body wears away as the valve is used. There are several factors that cause this wearing away; such as, friction between the valve seating core and the seat pocket when the valve is opened anc closed, the flow of the fluid around the seat pocket and the corrosive nature of the fluid passing through the valve. As the seat pocket wears away, the seal between the seating core and the seat pocket becomes less efficient. Eventually, the valve must be replaced with a new valve or the old valve is rebuilt. The latter case is extremely desirable in large valves because of the cost in replacing such valves.

One method of rebuilding these valves has been by appropriate machining of the seat pocket to add a bushing for providing a new seat. This method, however, is extremely expensive and quite frequently the bushings wash out.

Another method is to add material to the seat pocket, as by welding, and then machining the welded area to the proper shape for sealing engagement with the seating core. This method has the advantage in that no bushings are available which may be washed out. However, in many situations the labor expense to weld the valve bodies has become prohibitive.

Accordingly, it is the primary aim of the present invention to provide apparatus used in the rebuilding of the body of a valve that will quickly and easily add material to a valve body after which the valve may be properly machined.

In accordance with the invention, the body of a valve is rebuilt by using electrical welding means, first support means, second support means and driving means. The electrical welding means add material inside the valve body by using an electrode to provide an arc. The first support means detachably supports the valve body by aligning the valve body with a hole. The second support means rotatably supports the electrode of the welding means in a relatively fixed relationship to the valve body and has an elongate tubular member extending through the hole in the first support means. The driving means rotates the tubular member and electrode about the elongate axis of the tubular member for adding the material to a desired location on the valve body.

BRIEF DESCRIPTION OF THE DRAWINGS

Other objects and advantages of the invention will become apparent upon reading the detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 5:
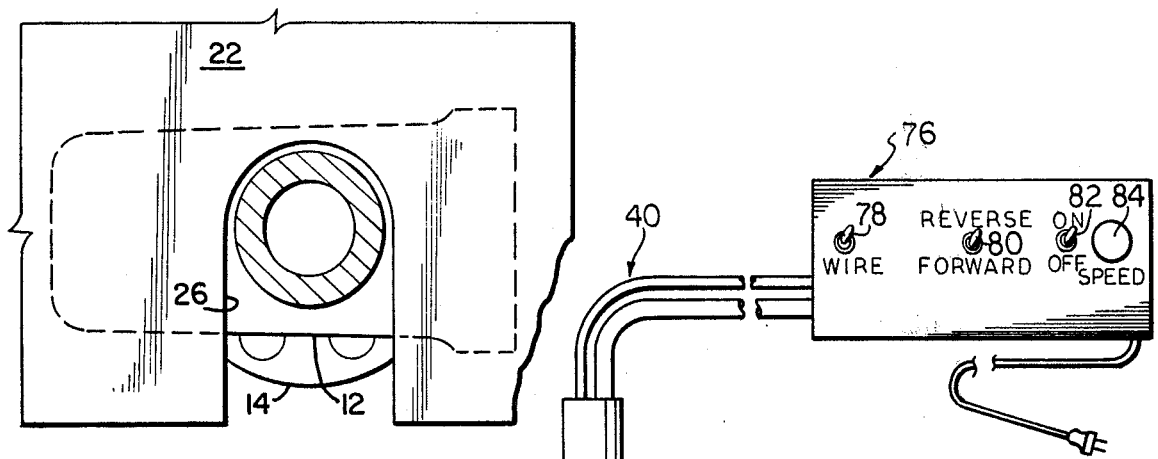
FIG. 5 is a view of a portion of the invention illustrated in FIG. 1 taken in the direction of arrows 5—5.
Figure 1:
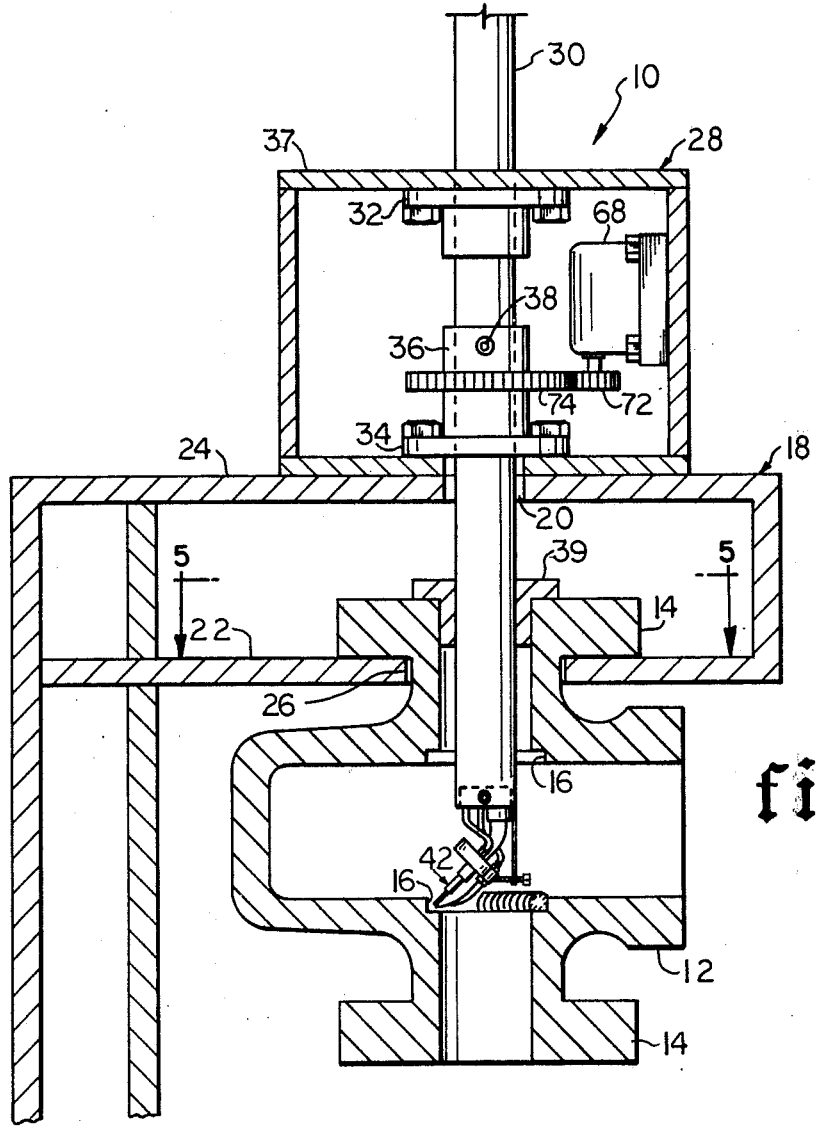
FIG. 1 is an elevational view, partly in section, of apparatus constructed according to the present invention.
Figure 3:
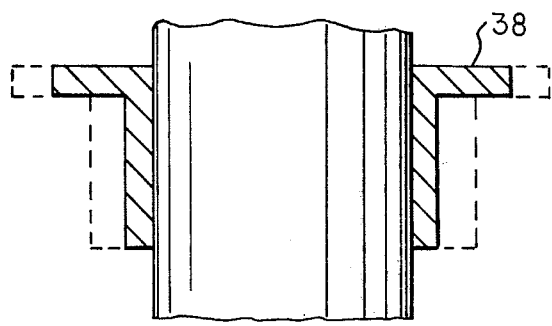
FIG. 3 is a view of a portion of the invention illustrated in FIG. 2 taken in the direction of arrows 3—3.
Figure 3:
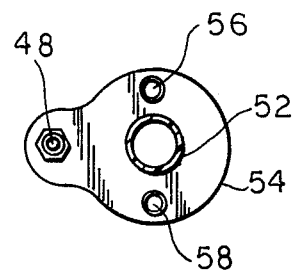
Figure 4:
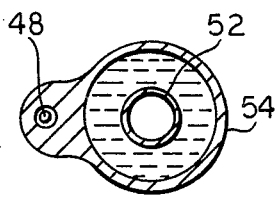
FIG. 4 is a view of a portion of the invention illustrated in FIG. 2 taken in the direction of arrows 4—4.

Turning first to FIGS. 1 and 5, apparatus 10 used in the rebuilding of a valve body 12 is generally illustrated. Although apparatus 10 will work on any type valve body, valve body 12 is illustrated as a gate valve having flanges 14 and seat pockets 16. Valve body 12 is detachably supported by a first support means 18 in alignment with a hole 20. Preferably, first support means 18 is constructed of a first surface 22 for detachably supporting valve body 12 and a second surface 24 having hole 20 disposed therein. A slot 26 is positioned within first surface 22 and is of sufficient length and width to permit passage of a neck of valve 12 into alignment with hole 20 while preventing passage of flange 14 through slot 26.

Figure 2:
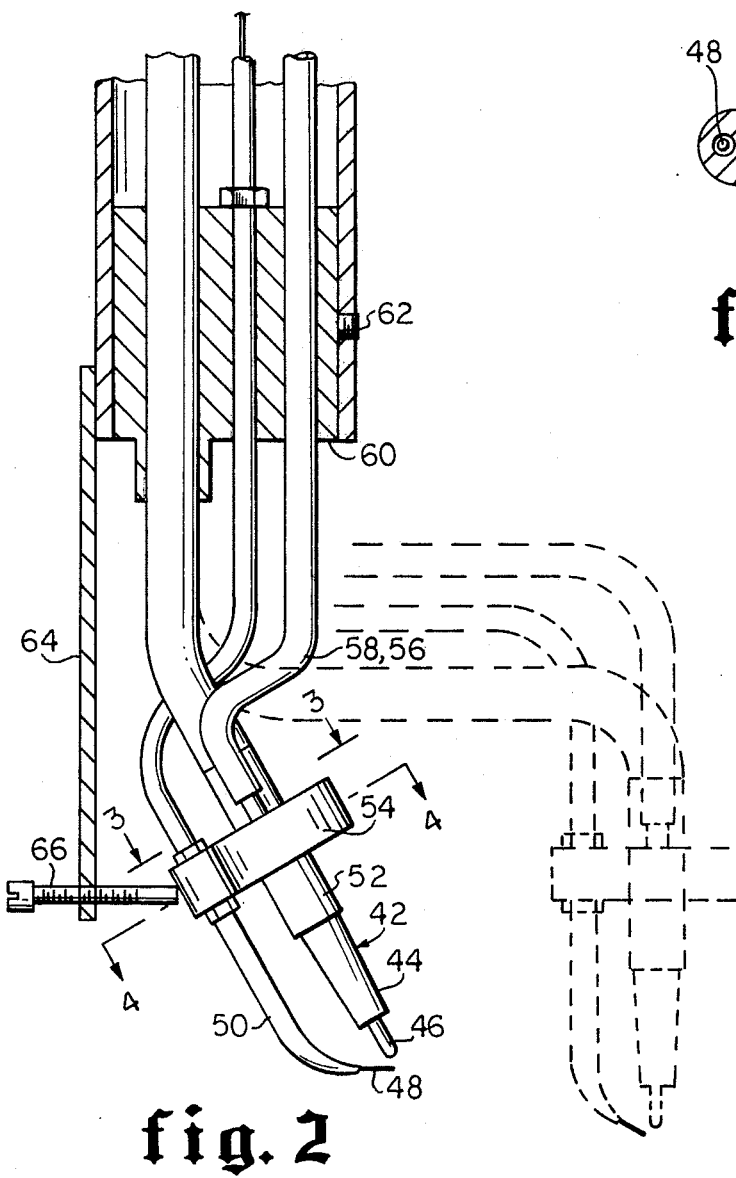
FIG. 2 is an enlarged elevational view, partly in section, of a portion of the support apparatus illustrated in FIG. 1.

Second support means 28 are supported by second support surface 24 and in turn rotatably supports an elongate tubular member 30. Preferably, this rotatable support is provided by a bearing 32, bearing plate 34 and sleeve 36 fastened to member 30 by a set screw 38 disposed within a framework 37 and a bushing 39 supported by valve body 12. Bushing 39 has an inside diameter slightly larger than the outside diameter of the elongated tubular member 30 and an outside diameter that may be varied to fit varying flow passages of different sized valves, as illustrated in dotted outline in FIG. 2.

An electric welding means 40 is used to add the material inside the valve and is supported by tubular member 30. Electric welding means 40 is of conventional design and includes an electrode 42 to provide an arc for heating. Although electrode 42 may be of any conventional design, it is illustrated with a ceramic cup 44 and a tungsten tip 46. The material added to valve 12 is disposed in close proximity to the tip 46 and is wire 48 carried by tube 50 through member 30. A heat insulating spacer 52 is disposed around electrode 42 with a water jacket 54 disposed around spacer 52. Water jacket 54 uses water to keep the electrode from overheating and has inlet circuit 56 and outlet conduit 58. A support bushing 60 with apertures extending therethrough is used to support electrical leads leading to electrode 42, tube 50 and conduits 56 and 58 is attached to member 30 by a set screw 62.

A portion 64 extends along the elongated axis of conduit 30 with a screw 66 threadably engaging extended portion 64 and contacting water jacket 54. Accordingly, tip 42 may be adjusted relative to seat pocket 16 of valve 12 by rotating screw member 66. However, when necessary to make a substantial movement of tip 42 for proper positioning relative to seat pocket 16, tip 42 may be drawn through member 30 and set off from the longitudinal axis. Tube 50, the electrical conductors leading to electrode 42 and conduits 56 and 58 will provide the necessary support to hold electrode 42 in the proper position, as illustrated in dotted outline in FIG. 2.

The force necessary to rotate the elongated tubular member 30 and thus electrode 42 is provided by an electric motor 68 disposed within framework 37. Although motor 68 can drive elongate member 30 by any conventional means, a gear system 70 is preferably used.

This gear system employs a driving gear 72 attached to the rotary portion of motor 68 and a driven gear 74 disposed circumferentially about sleeve 36.

Control means 76 preferably includes a wire feed switch 78, a reverse-forward switch 80, and on-off switch 82 and a speed control switch 84. Wire feed switch 78 is operably connected to apparatus (not shown) to feed wire 48 through tube 50 at a constant rate. Reverse-forward switch 80 is operably connected to motor 68 for controlling the direction of rotation of tip 42 relative to seat pocket 16. On-off switch 80 activates and inactivates the operation of apparatus 10. Speed control switch 84 is operably connected to motor 68 for regulating the rotational speed of member 30 and thus controls movement of electrode 42 relative to seat pocket 16. Thus, the rate at which material is added to seat pocket 16 is variably controlled to provide the proper amount of material to the valve being rebuilt. When desired, however, this rate may also be controlled by varying the speed at which wire 48 is fed through tube 58.

Thus, it is apparent that there has been provided, in accordance with the invention, an apparatus used in the rebuilding of the body of a valve that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. Apparatus used in the rebuilding of the body of a valve, comprising:

electrical welding means for adding material inside the valve body having an electrode to provide an arc;

first support means having a first portion including an opening for detachably supporting the valve body, the first portion being aligned with a hole in a second portion of the support means, second support means for rotably supporting the electrode of said welding means in a relatively fixed relationship to the valve body having an elongate tubular member extending through the hole in said first support means second portion and through the opening in the first portion; and dirving means for rotating the tubular member and electrode about the elongate axis of the tubular member for adding the material to a desired location in the valve body.

2. The apparatus of claim 1, including a water jacket for carrying water to keep the electrode from overheating disposed below said first support means and around the electrode and conduits for carrying water to and from the water jacket supported within the tubular member of said second support means.

3. The apparatus of claim 1, including control means for controlling the rotating speed of the tubular member.

4. The apparatus of claim 1, wherein said rotating means drives the tubular member in first and second directions and includes a reversible electric motor for providing the necessary force to drive the tubular member.

5. The apparatus of claim 4, wherein said rotating means includes a system of gears for transferring the driving force of said driving means from the electric motor to the tubular member.

6. The apparatus of claim 4, including control means for controlling the speed of the electric motor, thereby controlling the rotating speed of the tubular member in the first and second directions.

7. The apparatus of claim 1, wherein said second support means includes set off means for moving the electrode from a first position to a second position.

8. The apparatus of claim 7, wherein said set off means includes an extended portion of the tubular member and a screw means for moving the electrode to the second position operably connected to the extended portion.

9. The apparatus of claim 1, wherein said electrical welding means includes wire adding means to provide the material to be added to the valve body.

10. Apparatus used in rebuilding the seat pocket in a valve body, comprising:

electrical welding means for adding material to the valve body having an electrode to provide an arc and wire adding means to provide the material;

first support means for detachably supporting the valve body aligned with a hole having a slot permitting passage of the valve body for alignment with the hole and limiting movement of a flange on the valve body through the slot;

second support means for rotatably supporting the electrode of said welding means in a relatively fixed relationship to the seat pocket of the valve having an elongate tubular member extending through the hole and slot and into the valve, an extended portion of the tubular member and a screw member for moving the electrode from a first position to a second position;

a water jacket for carrying water to keep the electrode from overheating disposed below said first support means and around the electrode and conduits for carrying water to and from the water jacket supported within the tubular member of said second support means;

driving means for rotating the tubular member, electrode and conduits about the elongate axis of the tubular member in first and second directions having a reversible electric motor to provide a driving force and a system of gears for transferring the driving force from the electric motor to the tubular members; and control means for controlling the speed of the electric motor to thereby control the rotating speed of the tubular member.

11. An apparatus for rebuilding the seat pocket in a valve body by adding metal to the valve body seat and for holding the valve body during the process thereof comprising:

first support means having a slot therein permitting passage of a valve body neck so as to receive the flange adjacent the neck in order to thus support the valve body, second support means disposed in relatively fixed relationship to the slot of said first support means so that the electrode of the welding means is in communicating relation to the seat pocket of the valve body resting in said slot, and a welding means rotatably mounted on said second support means and extending through said slot into adjacent relation to the valve body so that operative rotation of the welding electrode support means may add material to the seat pocket of a valve body supported from the neck of said first support means.

* * * * *